United States Patent [19]
Arnold

[11] Patent Number: 5,584,058
[45] Date of Patent: Dec. 10, 1996

[54] SYSTEM AND METHOD FOR COMBINING MULTIPLE TRANSMITTERS IN A MULTIPLE CHANNEL COMMUNICATION SYSTEM

[75] Inventor: Pitt W. Arnold, Phoenix, Ariz.

[73] Assignee: Radio Frequency Systems, Inc., Phoenix, Ariz.

[21] Appl. No.: 271,255

[22] Filed: Jul. 7, 1994

Related U.S. Application Data

[63] Continuation of Ser. No. 837,478, Feb. 18, 1992, abandoned.

[51] Int. Cl.$^6$ ...................................... H04B 1/02
[52] U.S. Cl. .................... 455/103; 455/129; 455/33.1; 333/129; 333/132
[58] Field of Search ................... 455/103, 120, 455/125, 129, 33.1; 333/126, 129, 132, 134

[56] References Cited

U.S. PATENT DOCUMENTS

| | | | |
|---|---|---|---|
| 2,594,055 | 6/1949 | Miller | 455/103 |
| 3,474,451 | 10/1969 | Abel | 455/103 |
| 3,512,103 | 6/1968 | Berman | 455/103 |
| 4,449,128 | 5/1984 | Weir | 455/103 |
| 4,644,303 | 2/1987 | Jachowski | 333/134 |
| 4,723,306 | 2/1988 | Fuenfgelder et al. | 455/103 |
| 5,034,707 | 7/1991 | Kagstrom | 333/126 |
| 5,163,181 | 11/1992 | Koontz | 455/103 |
| 5,229,729 | 7/1993 | Nishikawa et al. | 333/126 |

OTHER PUBLICATIONS

"The Design of a GSM Base–Station Tuneable Combiner" *Microwave Engineering Europe;* Hill et al; Oct. 1992 pp. 57–58 and 61–62, 65.

*Primary Examiner*—Andrew Faile
*Attorney, Agent, or Firm*—Ware, Fressola, Van Der Sluys & Adolphson

[57] ABSTRACT

A system (10) for combining a plurality of transmission channels within a multiple channel communication system includes a master computer (20) that controls the transmission frequency and schedule of a plurality of channel transmitters (18). Each channel transmitter (18) is electrically connected to a channel transmitter combiner filter (12). Each channel transmitter combiner filter (12) is fixedly tuned to a unique bandwidth window along the electromagnetic spectrum, and two sets (24), (26) of channel transmitter combiner filters are formed of the channel transmitter combiner filters (12) whose unique bandwidth windows are adequately spaced for electrical isolation along the electromagnetic spectrum. Each set (24), (26) of channel transmitter combiner filters is electrically connected to a common antenna (28) by means of a three decibel (3 dB) coupler (22).

26 Claims, 7 Drawing Sheets

SYSTEM AND METHOD FOR COMBINING MULTIPLE TRANSMITTERS IN A MULTIPLE CHANNEL COMMUNICATION SYSTEM

This is a continuation application(s) Ser. No. 07/837,478 filed Feb. 18,1992 abandoned.

BACKGROUND OF THE INVENTION

1. Field of the Invention

The present invention relates to multiple channel communication systems and, more particularly, to a system and method for combining a multiple number of individual transmission channels, each operating at a selectable transmission frequency that is within a correspondingly individual fixed bandwidth window, in a multiple channel communication system.

2. Description of the Prior Art

Frequency agility, or the ability to select an allocated frequency within an assigned band of frequencies, is a desirable characteristic of a multiple channel communication system. A cellular telephone communication system, in particular, benefits from frequency agility by combining a multiple number of channel transmitters, each transmitting at a selected frequency, in a multiple channel communication system. A current method of providing frequency agility in a cellular telephone communication system is realized by motor tuning each individual resonator of a channel transmitter combiner filter. The channel transmitter combiner filter resonators are motor tuned to allow a transmission frequency from an associated channel transmitter to pass. Since the transmission frequency of a channel transmitter may need to be changed, the resonators of an associated channel transmitter combiner filter must be retuned to accommodate for such a change.

Several individually and uniquely motor tuned channel transmitter combiner filters, and their associated channel transmitters, can be grouped together in a parallel connection to a common antenna. This connection permits simultaneous transmissions from several channel transmitters to be combined at a single antenna, thus a channel transmitter combiner. In such a motor tuned cellular telephone communication system, there is a complexity associated with controlling the motor tuning of the channel transmitter combiner filter resonators. This complexity is due to a series of electromechanical relays and electronic feedback circuits that are required of the motor tuning process. As a result of this complexity, the system exhibits a low reliability and a high cost.

It is therefore desirable to obtain frequency agility in cellular telephone communication systems without the complexity of motor tuned channel transmitter combiner filters.

SUMMARY OF THE INVENTION

The present invention contemplates frequency agility in, for example, a cellular telephone communication system by providing each system channel transmitter with an associated fixed bandwidth channel transmitter combiner filter. The bandwidth, or window, of the channel transmitter combiner filter is wide enough for the associated channel transmitter to be set at any one of a number of frequencies within the window. A grouping of several channel transmitters, each having an associated channel transmitter combiner filter that is fixedly tuned to a unique bandwidth window, allows channel transmissions to a common antenna to occur at any frequency within the total bandwidth covered by the entire group of filters.

In the United States, there is presently a 12.5 MHz bandwidth frequency allocation in the electromagnetic spectrum that is dedicated to wireline transmissions in cellular telephone communication systems. This allocation is broken up into a 10 MHz bandwidth allocation covering from 880.0 MHz to 890.0 MHz in the electromagnetic spectrum and a 2.5 MHz bandwidth allocation covering from 891.5 MHz to 894.0 MHz in the electromagnetic spectrum. A group of, for example, 20 channel transmitters, each having an associated channel transmitter combiner filter with a 625 kHz bandwidth window, can cover the entire cellular telephone communication wireline transmission band of the electromagnetic spectrum. In such a group, each filter is centered about a unique frequency in the cellular telephone communication wireline transmission band of the electromagnetic spectrum, and the bandwidth of each filter covers a unique window within this band. In other words, a first filter covers from 880.0 MHz to 880.625 MHz, a second filter covers from 880.625 MHz to 881.250 MHz, and so on. Also, the frequency of each channel transmitter can be changed to any one of a number of frequencies within the bandwidth window of its associated channel transmitter combiner filter, and the channel transmitter combiner filter need not be retuned for such a change. Furthermore, each channel transmitter combiner filter is connected to a common antenna such that a transmission from at least one channel transmitter can be broadcast by the common antenna at any frequency within the cellular telephone communication band. Thus, the entire cellular telephone communication wireline transmission band is covered and selectable by at least one channel transmitter, and frequency agility is achieved.

It should be noted that the above described system is directly applicable to the cellular telephone communication non-wireline transmission band of the electromagnetic spectrum, among others.

A primary objective of the present invention is to provide a method for combining a multiple number of communication channels in a frequency agile communication system.

Another objective of the present invention is to provide a method for combining a multiple number of channel transmitters in a frequency agile cellular telephone communication system.

A further objective of the present invention is to obtain frequency agility in a cellular telephone communication system without the need for motor tuning the resonators of each channel transmitter combiner filter.

DETAILED DESCRIPTION OF THE PRESENT INVENTION

Figure 1:
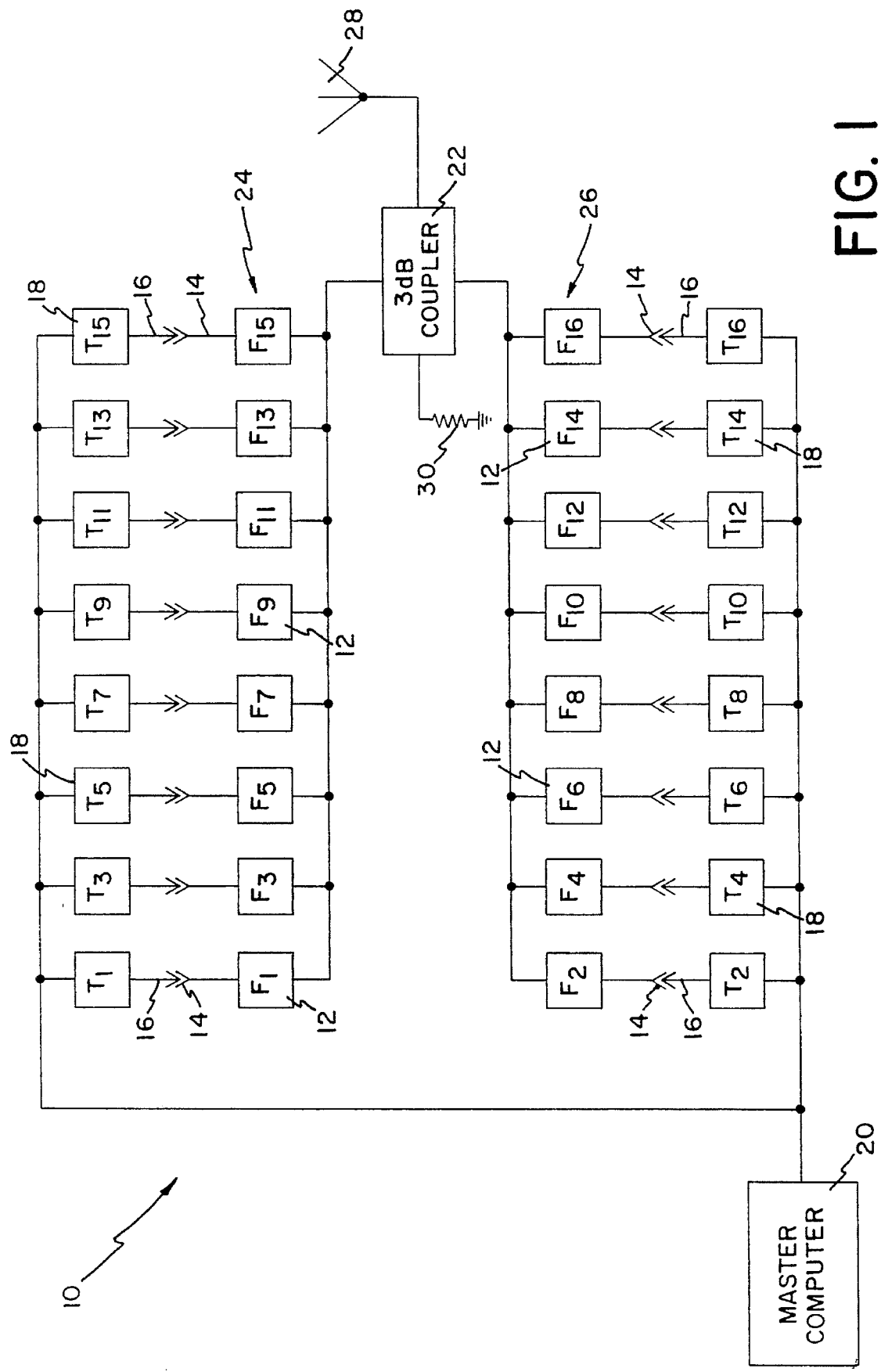
FIG. 1 is a schematic representation of a frequency agile cellular telephone communication system with a common antenna.

Referring to FIG. 1, there is shown a multiple channel, frequency agile cellular telephone transmission system 10. For the purpose of this description, this system 10 operates over a 10 MHz bandwidth frequency allocation covering from 880.0 MHz to 890.0 MHz in the electromagnetic spectrum, a portion of the present cellular telephone communication wireline transmission band in the United States. Of course, this system 10 is in no way limited to this region of the electromagnetic spectrum.

The system 10 shown in FIG. 1 includes sixteen channel transmitter combiner filters 12. Each of these filters 12 has an input port 14 that is connected to an output port 16 of one of sixteen associated channel transmitters 18. Each channel transmitter 18 is connected to a master computer 20 that controls the transmission frequency of all channel transmitters 18. Each channel transmitter combiner filter 12 is fixedly tuned to a 625 KHz bandwidth window, and each of these windows is centered about a unique frequency in the 10 MHz bandwidth frequency allocation of the electromagnetic spectrum. A spacing arrangement between the center frequency of each window is used to ensure an electrical isolation between channel transmitters with physically adjacent filters 12. Also, a three decibel (3 dB) coupler 22 is used to electrically isolate channel transmitters 18 whose channel transmitter combiner filter bandwidth windows are adjacent along the electromagnetic spectrum. Both the window spacing arrangement and the 3 dB coupler 22 are critical in obtaining frequency agility in this system 10.

The window spacing arrangement is realized by forming two sets of eight channel transmitter combiner filters 12. A first set 24 is made up of the odd numbered filters as shown in FIG. 1, and a second set 26 is made up of the even numbered filters, also shown in FIG. 1. Within each filter set 24, 26, the bandwidth window of each filter 12 is separated from the bandwidth window of a physically adjacent filter 12 by a 625 KHz bandwidth gap, or the bandwidth of a window. These bandwidth gaps in between the physically adjacent filters 12 of each filter set 24, 26 are covered by the bandwidth windows of the filters 12 from the opposite filter set 26, 24, respectively. In other words, a first filter ($F_1$) 12 in the first set 24 covers from 880.0 MHz to 880.625 MHz, a first filter ($F_2$) 12 in the second set 26 covers from 880.625 to 881.250 MHz, and so on until the last filter ($F_{16}$) 12 in the second set 26 covers from 889.375 MHz to 890.000 MHz. Thus, the entire 10 MHz bandwidth frequency allocation of the electromagnetic spectrum is covered. Furthermore, the 625 Khz bandwidth gaps in between the physically adjacent channel transmitter combiner filters 12 of each filter set 24, 26 provide an electrical isolation of at least 15 dB in between transmissions from the correspondingly adjacent channel transmitters 18.

The 3 dB coupler 22, on the other hand, provides an electrical isolation in between the channel transmitters 18 associated with the channel transmitter combiner filters 12 from the first filter set 24, and the channel transmitters 18 associated with the channel transmitter combiner filters 12 from the second filter set 26, and vice-versa. Since the bandwidth windows of the filters 12 from the first set 24 are adjacent to the bandwidth windows of the filters 12 from the second set 26 along the electromagnetic spectrum, and vice-versa, there are several points along this spectrum where a filter 12 from the first set 24 and a filter 12 from the second set 26 cover the same frequency. In other words, at the frequencies of 880.625 MHz, 881.250 MHz, and so on until 889.375 MHz, there is frequency coverage by a filter 12 from both the first set 24 and the second set 26. At these frequencies, there is theoretically no loss in between these overlapping filters 12. Consequently, the channel transmitters 18 associated with the overlapping filters 12 will couple to each other during transmissions, resulting in a half power transmission loss and transmission distortions. The 3 dB coupler provides an electrical isolation of at least 15 dB in between transmissions from the channel transmitters 18 of the associated overlapping channel transmitter combiner filters 12, thereby minimizing transmission distortions, although the half power transmission loss is still incurred. The half power transmission loss is a result of splitting the transmission power in between a resistance 30 associated with the 3 dB coupler 22 and a common antenna 28.

Overall, the system 10 shown in of FIG. 1 provides frequency agility through the ability of the master computer 20 to select any frequency within the 10 MHz bandwidth frequency allocation of the electromagnetic spectrum. The master computer 20 realizes this ability by controlling each channel transmitter 18 to operate at a selectable transmission frequency that is within the bandwidth window of each associated channel transmitter combiner filter 12. Since the bandwidth windows of all the channel transmitter combiner filters 12 are combined to cover the entire 10 MHz bandwidth allocation, all the frequencies within this allocation are selectable, and thus the scheme 10 is frequency agile. Furthermore, this frequency agility is achieved with fixedly set channel transmitter combiner filters 12 that do not require motor tuning.

Figure 2:
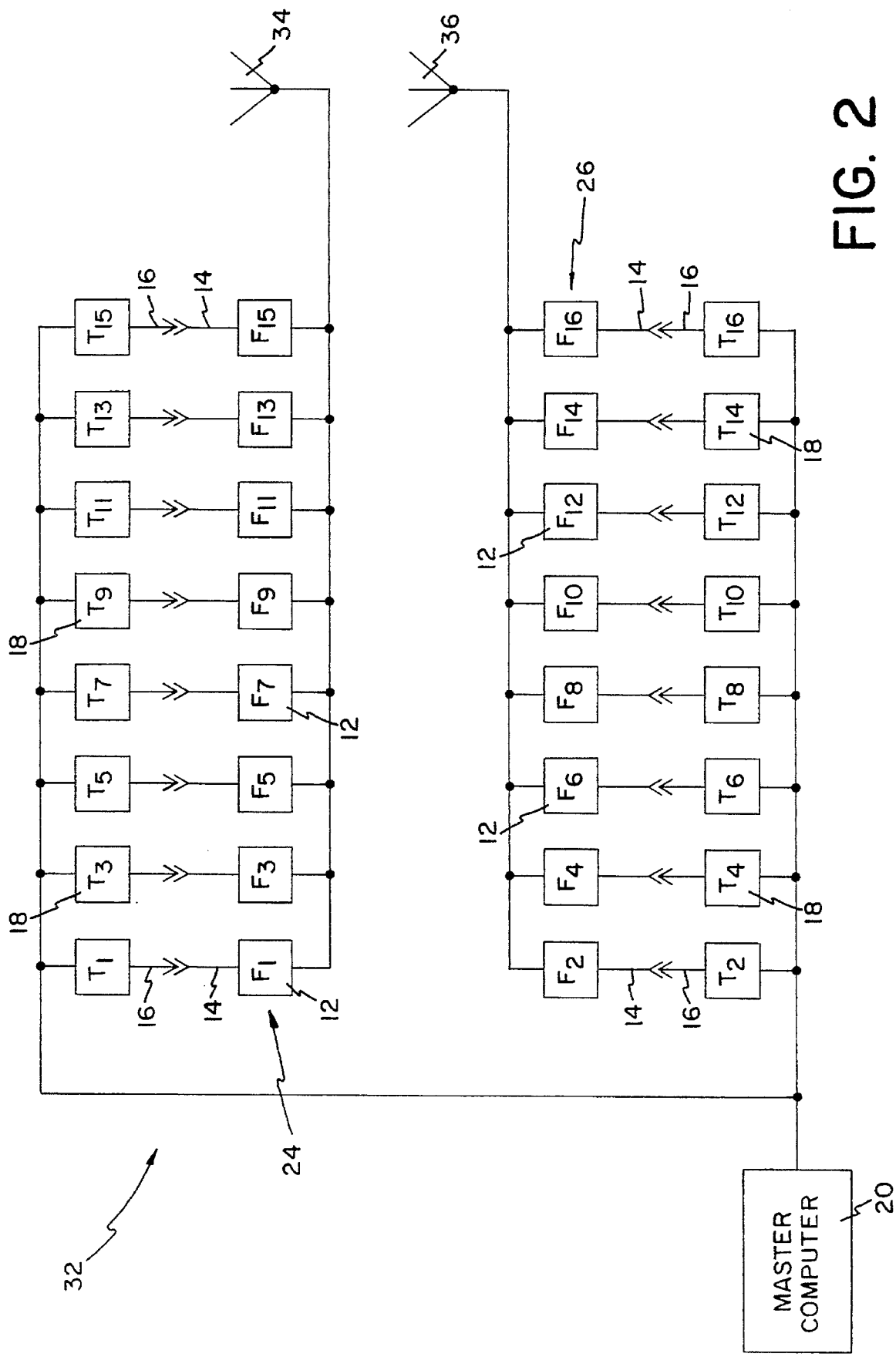
FIG. 2 is a schematic representation of a frequency agile cellular telephone communication system with two antennae.

Referring to FIG. 2, there is shown a multiple channel, frequency agile cellular telephone transmission system 32 that is more efficient than the system 10 shown in FIG. 1. The system 32 shown in FIG. 2 provides a separate antenna 34, 36 for each set of channel transmitter combiner filters 24, 26, respectively, and their associated channel transmitters 18. By providing these separate antennae 34, 36, there is no longer a need for the 3 dB coupler 22 of FIG. 1. Thus, there is no longer a half power transmission loss due to the 3 dB coupler 22 and the full power of the channel transmitters 18 can be broadcast by the corresponding antenna 34, 36. All other elements of the system 32 of FIG. 2 are identical to that of the system 10 of FIG. 1, including its frequency agility, and therefore these elements are numerically identified as such.

Figure 3:
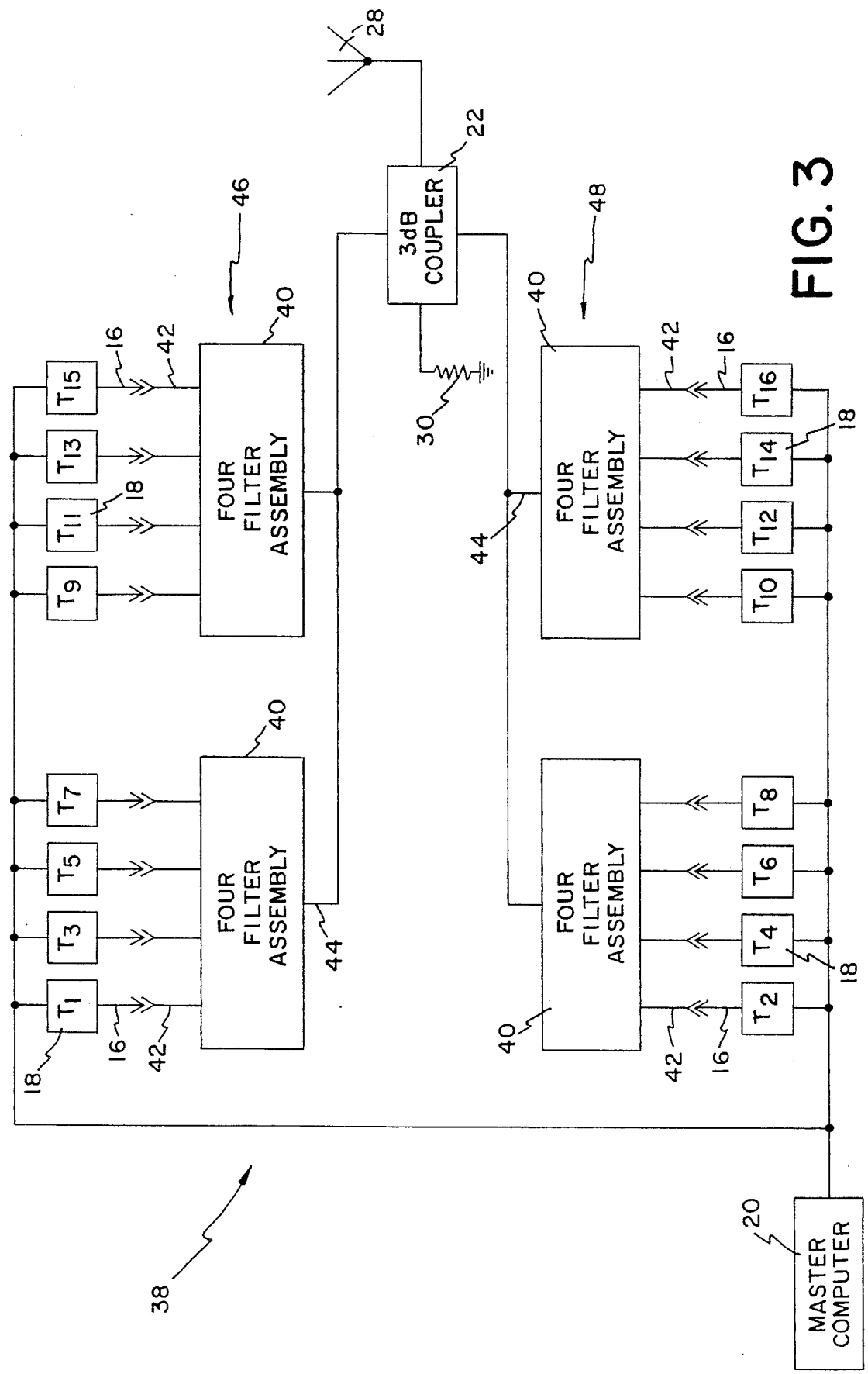
FIG. 3 is a schematic representation of a frequency agile cellular telephone communication system with four four-filter assemblies and a common antenna.

Referring to FIG. 3, there is shown a practical, multiple channel, frequency agile cellular telephone transmission system 38. In this system 38, there are four four-filter assemblies 40, each of which incorporates four of the channel transmitter combiner filters 12 shown in the systems 10, 32 of FIGS. 1 and 2, respectively. Two of these four-filter assemblies 40 form a set of eight channel transmitter combiner filters 12, and there are two sets of eight channel transmitter combiner filters 12 in the system 38. A first set 46 is made up of the two four-filter assemblies 40 that are connected to the odd numbered channel transmitters 18, as shown in FIG. 3. A second set 48 is made up of the two four-filter assemblies 40 that are connected to the even numbered channel transmitters 18, also shown in FIG. 3. The four four-filter assemblies 40 are used in this system 38 mainly because of a symmetrical fit to the number of channel transmitters 18, and thus there is no restriction from using other size filter assemblies. Each of these four-filter assemblies 40 has four input ports 42, each of which is connected to an output port 16 of one of the sixteen associated channel transmitters 18. Each of the four-filter assemblies 40 also has a common output port 44 that is shared by the four-filters incorporated in each assembly 40. The use of the four four-filter assemblies 40 is thus practical in that the number of output port 44 connections are decreased as compared to the systems 10, 32, of FIGS. 1 and 2, respectively. All other elements of the system 38 of FIG. 3 are identical to that of the system 10 of FIG. 1, including its frequency agility, and therefore these elements are numerically identified as such.

Figure 4:
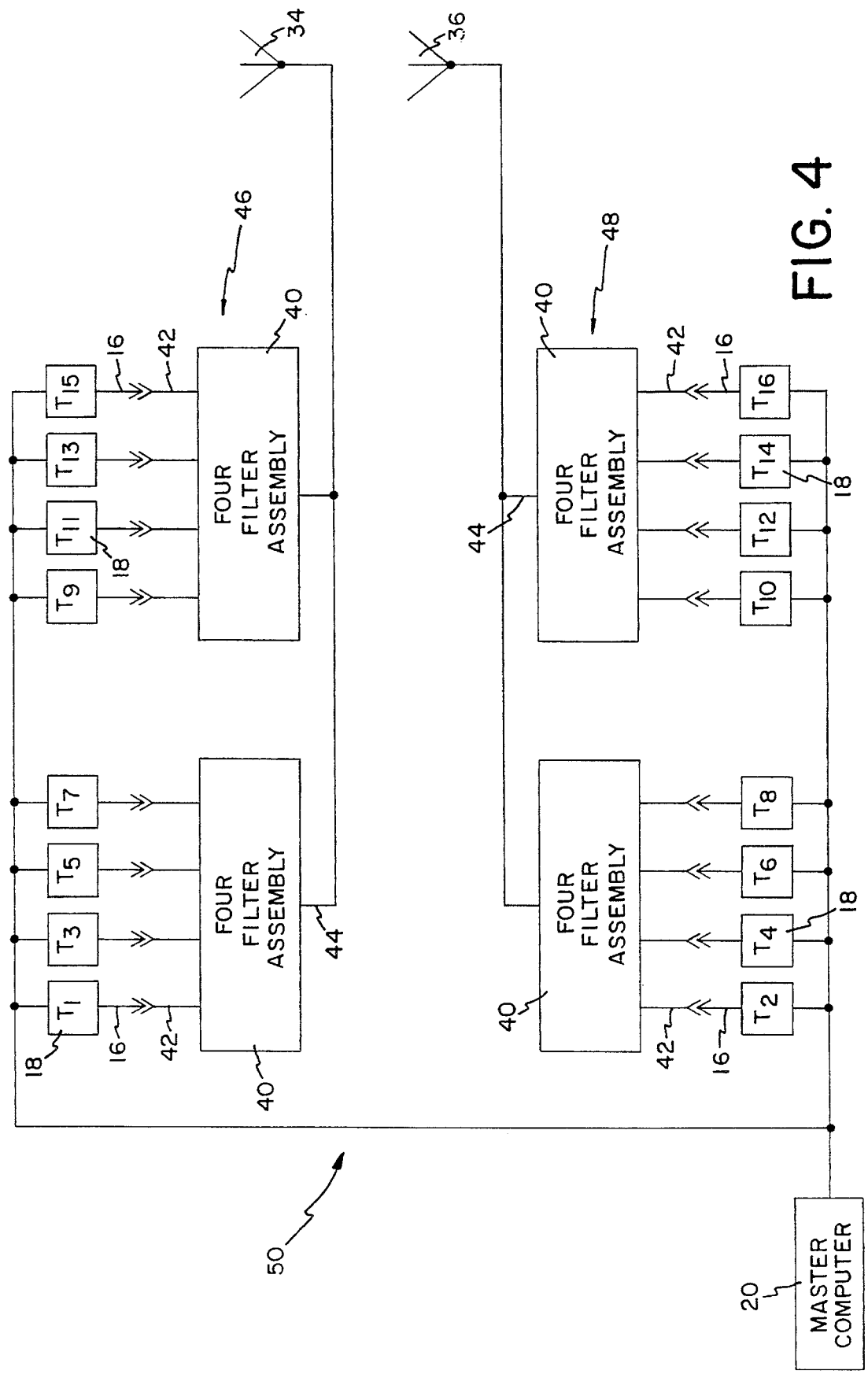
FIG. 4 is a schematic representation of a frequency agile cellular telephone communication system with four four-filter assemblies and two antennae.

Referring to FIG. 4, there is shown another practical, multiple channel, frequency agile cellular telephone transmission system 50. This system 50, however, provides a separate antenna 34, 36 for each set 46, 48 of the four-filter assemblies 40, respectively. As explained in the system 32 of FIG. 2, this two antenna arrangement allows the full power of each channel transmitter 18 to be broadcast by the corresponding antenna 34, 36, thus increasing the efficiency of the scheme 50. Again, all other elements of the system 50 of FIG. 4 are identical to those of the previous Figures, and therefore, the elements are identified as such.

Figure 5:
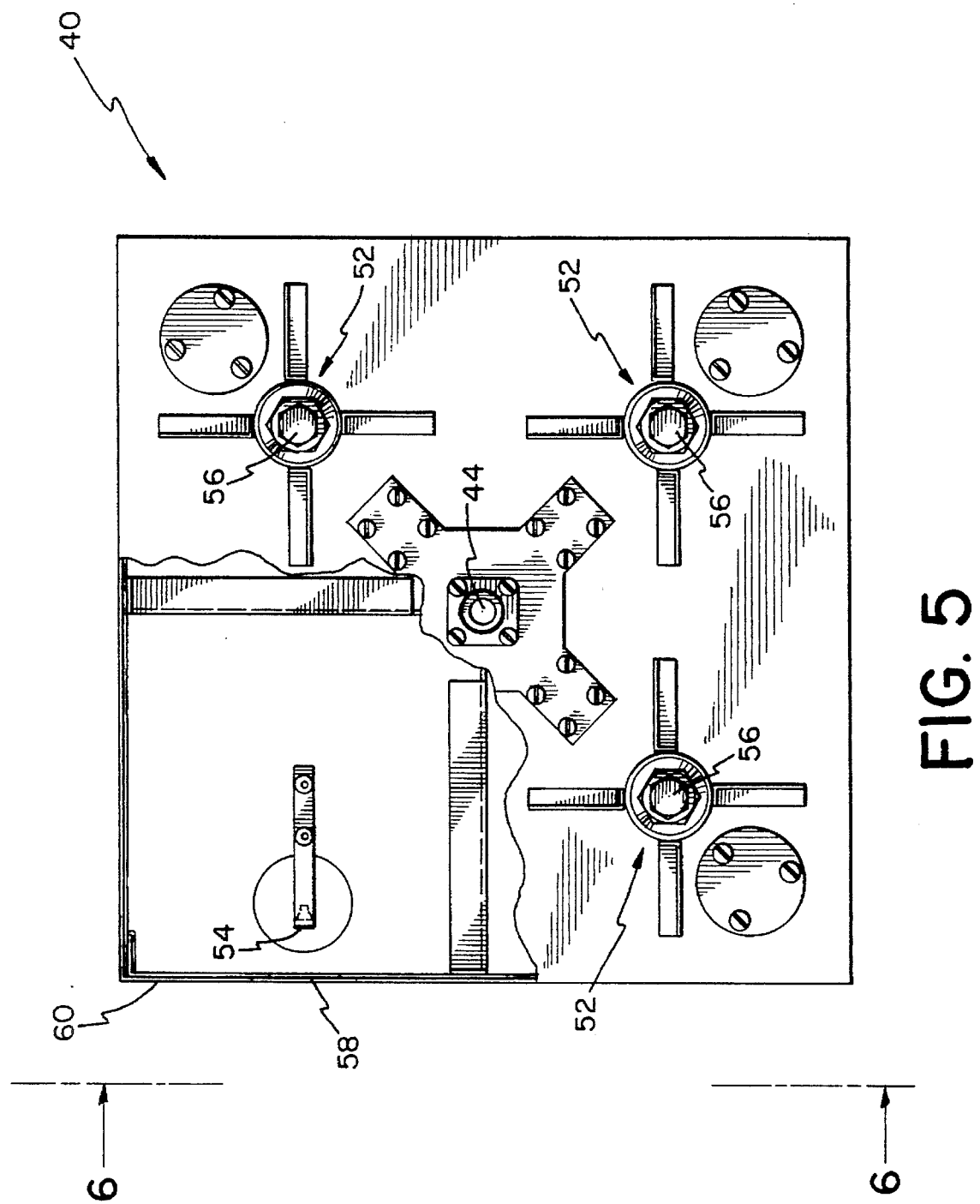
FIG. 5 is a partial cross-sectional end view of a four-filter assembly taken along line 5—5 of FIG. 6.
Figure 6:
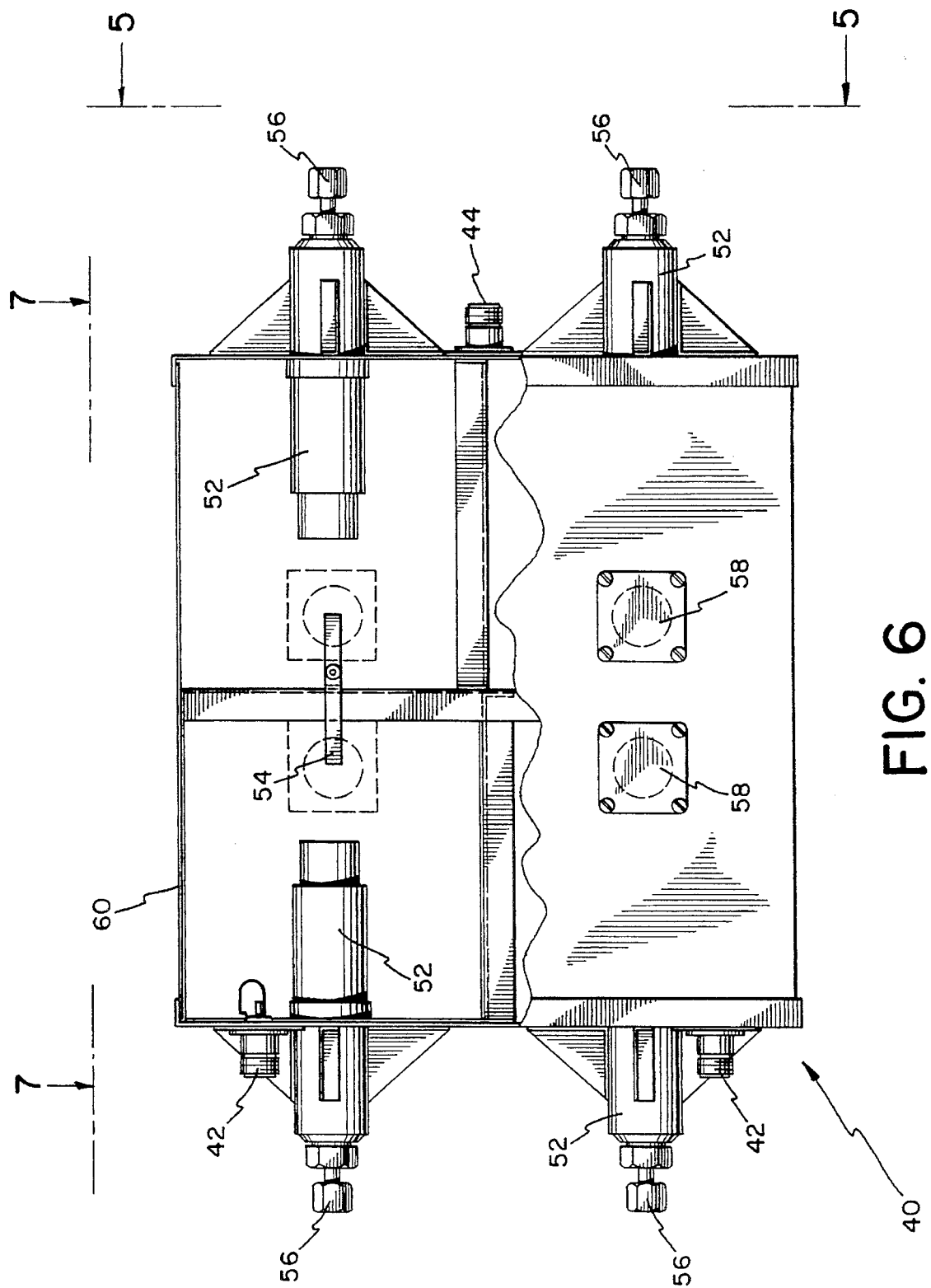
FIG. 6 is a partial cross-sectional side view of a four-filter assembly taken along line 6—6 of FIG. 5.
Figure 7:
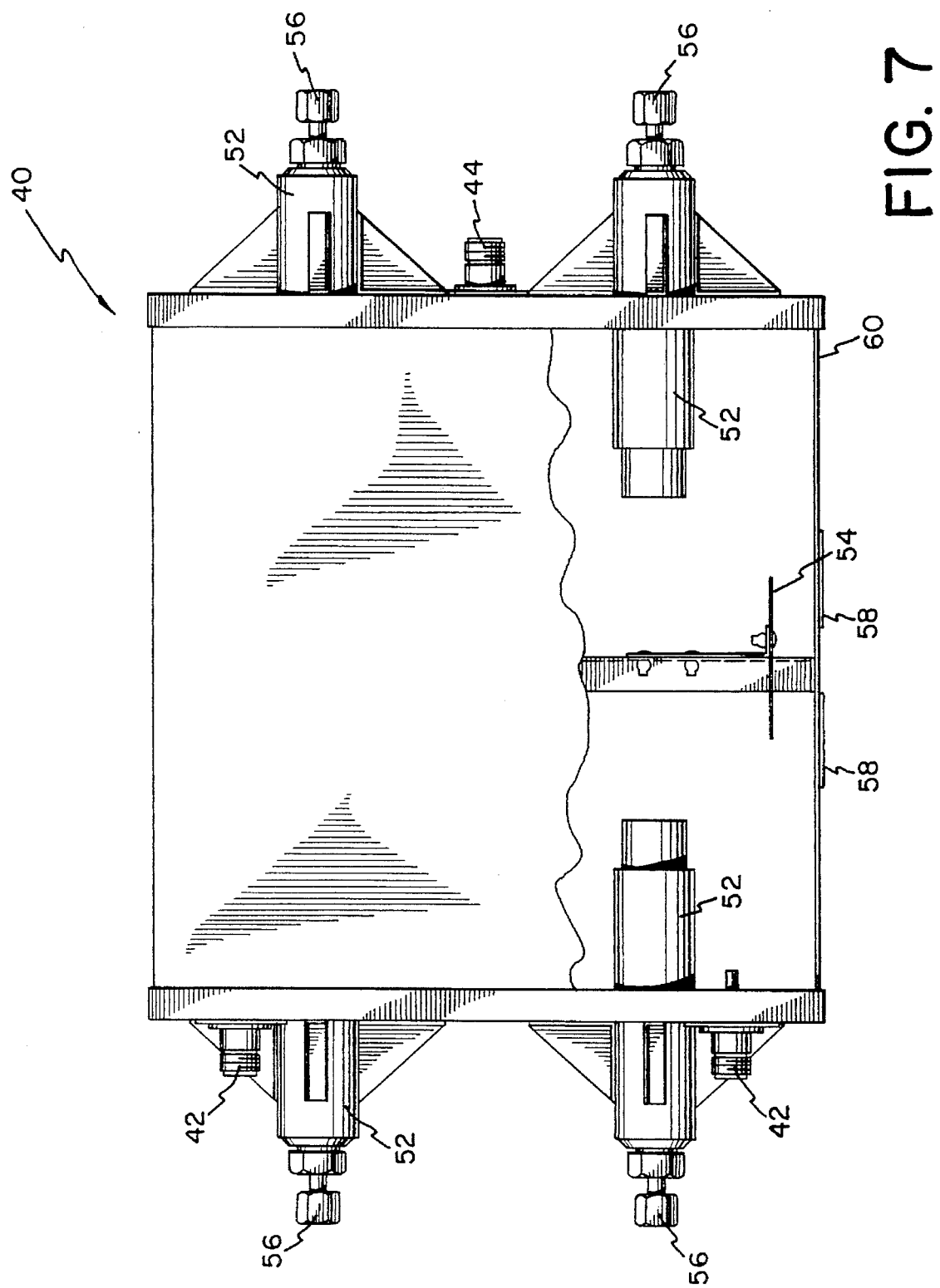
FIG. 7 is a partial cross-sectional side view of a four-filter assembly taken along line 7—7 of FIG. 6.

Referring to FIGS. 5, 6, and 7, there is shown a partial cross-sectional end view, and two partial cross-sectional side views, respectively, of a four-filter assembly 40. The four-filter assembly 40 includes four input ports 42 and a common output port 44. The assembly 40 is internally broken up into four resonant cavities, each of which contains two resonators 52 and a coupling strap 54. Each resonant cavity filter in the four-filter assembly 40 is fixedly tuned to a unique 625 KHz bandwidth window by adjusting the resonators 52 and the coupling straps 54. The resonators 52 are tuned by turning a tuning rod 56 on the exterior of the assembly, and the coupling straps 54 are tuned by bending their shape. The coupling straps 54 are accessible through a number of corresponding access ports 58 in the assembly housing 60. Once an assembly 40 is tuned, it may be used in, for example, a multiple channel, frequency agile cellular telephone transmission system, like those described in FIGS. 3 and 4.

It is thus seen that the objectives set forth above are efficiently attained and, since certain changes may be made in the above described systems without departing from the scope of the invention, it is intended that all matter contained in the above description and shown in the accompanying drawings shall be interpreted as illustrative and not in a limiting sense.

What is claimed is:

1. A multiple channel communication system comprising:

N channel transmitter combiner filters ($F_1, F_2, \ldots F_{16}$), each having an input and an output and each having a unique bandpass bandwidth window, where N is an integer greater than two;

N channel transmitters ($T_1, T_2, \ldots T_{16}$), each having an output, the output of each channel transmitter connected to an input of a different channel transmitter combiner filter, each channel transmitter generating a controllable transmission output at any one of a plurality of frequencies all within the bandwidth window of the interconnected channel transmitter combiner filter;

means, interconnected to each channel transmitter, for controlling the transmission output frequency of each channel transmitter so that the transmission output frequency of each channel transmitter is within the unique bandpass bandwidth window of the particular channel transmitter combiner filter to which said each channel transmitter is interconnected;

means for grouping at least some of the outputs of a first subset of the N channel transmitter combiner filters into a first set of channel transmitter combiner filters;

means for grouping at least some of the outputs of a second subset of N channel transmitter combiner filters into a second set of channel transmitter combiner filters and means for combining the outputs of the at the least first and second sets of channel transmitter combiner filters at an electromagnetic radiation means.

2. A system as described in claim 1, wherein each of said N unique transmission bandwidth windows is within a cellular telephone communication transmission band of the electromagnetic spectrum.

3. A system as described in claim 1, wherein said means for controlling the transmission output frequency of each of said N channel transmitters is a master computer.

4. A multiple channel communication system as defined in claim 1 wherein the N channel transmitter combiner filters are grouped into first and second sets of channel transmitter combiner filters, wherein said unique bandwidth windows of the first set of channel transmitter combiner filters are adjacent to said unique bandwidth windows of the second set of channel transmitter combiner filters along the electromagnetic spectrum, and wherein the outputs of the first set of channel transmitter combiner filters are electrically connected to each other and wherein the outputs of the second set of channel transmitter combiner filters are electrically connected to each other.

5. A system as described in claim 4, wherein each said set of channel transmitter combiner filters is electrically connected to said electromagnetic radiation means by a three decibel (3 dB) coupler.

6. A system as described in claim 5, wherein said electromagnetic radiation means is a single antenna.

7. A system as described in claim 4, wherein each said set of channel transmitter combiner filters is directly electrically connected to said electromagnetic radiation means.

8. A system as described in claim 7, wherein said electromagnetic radiation means is a separate antenna for each of said first and second sets of fixedly tuned channel transmitter combiner filters.

9. A system as described in claim 1, wherein each of said N channel transmitter combiner filters is housed in one of a plurality of multiple filter assemblies, each filter assembly having at least two input ports and one common output port, each input port connected to an output of one channel transmitter, and the output port of each assembly connected to the electromagnetic radiation means.

10. A multiple channel communication system as defined in claim 9 wherein each of said plurality of multiple filter assemblies comprises:

a housing;

a plurality of resonant cavities within said housing;

a like plurality of the input ports mounted to said housing to interface with each of said plurality of resonant cavities; and wherein the common output port is mounted to said housing to interface with all of said plurality of resonant cavities.

11. A system as described in claim 10, wherein each of said plurality of multiple filter assemblies further comprises a plurality of resonators and coupling straps for fixedly setting the bandpass bandwidth of each of said N channel transmitter combiner filters.

12. A system as described in claim 11, wherein each of said plurality of multiple filter assemblies incorporate four of said N channel transmitter combiner filters into a four resonant cavity housing, wherein each of said four channel transmitter combiner filters is associated with one of said four resonant cavities, wherein each of said four resonant cavities has one of said input ports, and wherein all of said four resonant cavities share the common output port.

13. A system as described in claim 12, wherein each of said four resonant cavities contains two resonators, and wherein each of said four resonant cavities contains one coupling strap.

14. A method for combining N channel transmitters in a multiple channel communication system, where N is an even integer greater than two, wherein each of said N channel transmitters operates at any one of a unique plurality of selectable transmission frequencies, and wherein each frequency of each of said unique plurality of selectable transmission frequencies is within a unique bandwidth window, said method comprising the steps of:

fixedly setting N channel transmitter combiner filters so that each channel transmitter combiner filter covers a unique bandwidth window;

electrically connecting each of the N channel transmitters to one of said N fixedly tuned channel transmitter combiner filters;

controlling each of said N channel transmitters to transmit at any one of a plurality of selectable transmission frequencies within the unique bandwidth window of the particular channel transmitter combiner filter to which the respective channel is connected;

grouping said N of channel transmitter combiner filters whose unique bandwidth windows are not adjacent along the electromagnetic spectrum into at least one set of channel transmitter combiner filters;

electrically connecting the outputs of each said set of channel transmitter combiner filters; and electrically connecting each said set of outputs of the channel transmitter combiner filters to an electromagnetic radiation means;

whereby controlled transmissions from N channel transmitters are passed through said electrically connected ones of said N channel transmitter combiner filters and are broadcast by said electromagnetic radiation means.

15. A method as described in claim 14, wherein said step of electrically connecting each said set of outputs of the channel transmitter combiner filters to an electromagnetic radiation means comprises the sub steps of:

electrically connecting each said set of outputs to a 3 dB coupler; and electrically connecting said 3 dB coupler to a single antenna.

16. A method as described in claim 14, wherein said step of electrically connecting each said set of outputs of the channel transmitter combiner filters to an electromagnetic radiation means comprises the sub step of electrically connecting each set of outputs to a separate antenna.

17. A multiple channel communication system comprising:

N channel transmitter combiner filters, where N is an even integer greater than two, each filter having an input and an output, and each having a unique bandpass bandwidth window, said N channel transmitter combiner filters being grouped into two sets of channel transmitter combiner filters in an interleaving fashion according to their unique bandwidth windows, with no two filters within a set having unique bandwidth windows which are immediately adjacent along the electromagnetic spectrum;

N channel transmitters, each transmitter operating at any one of a plurality of selectable transmission frequencies all within the unique bandwidth window of one of the N channel transmitter combiner filters, each transmitter having an output connected to the input of said one combiner filter;

means for controlling the operation of each of said N channel transmitters;

means for combining the outputs of each set of channel transmitter combiner filters; and means for transferring said combined outputs of each set of filters to an electromagnetic radiation means.

18. A multiple channel communication system as defined in claim 17, wherein each of said N channel transmitters transmits at a frequency within a cellular telephone communication transmission band of the electromagnetic spectrum.

19. A multiple channel communication system as defined in claim 17, wherein said means for controlling the operation of each of said N channel transmitters is a master computer.

20. A multiple channel communication system as defined in claim 17, wherein the means for transferring the combined outputs of each set of filters to an electromagnetic radiation means is a three decibel (3 dB) coupler, connected to the combined outputs of both sets of filters.

21. A multiple channel communication system as defined in claim 20, wherein the electromagnetic radiation means is a single antenna.

22. A multiple channel communication system as defined in claim 17, wherein the electromagnetic radiation means is a separate antenna for each set of filters.

23. A multiple channel communication system as defined in claim 17, wherein at least some of the N channel transmitter filters are housed in a multiple filter assembly, each filter assembly having at least two input ports and one common output port, each input port connected to an output of one channel transmitter, and the output port of each assembly connected to the electromagnetic radiation means.

24. A multiple channel communication system as defined in claim 23, wherein each of said plurality of multiple filter assemblies comprises:

a housing;

a second plurality of resonant cavities within said housing;

wherein a second plurality of the input ports are mounted to said housing to interface with each of said second plurality of resonant cavities; and wherein the common output port is mounted to said housing to interface with all of said second plurality of resonant cavities.

25. A multiple channel communication system as defined in claim 17, wherein the first and second sets of filters are each divided into subsets, and wherein each said subset of filters is housed in a corresponding multiple filter assembly, each filter assembly having at least two input ports and one common output port, each input port connected to an output of one channel transmitter, and the output port of each assembly connected to the electromagnetic radiation means.

26. A multiple channel communication system as defined in claim 25, wherein each of said plurality of multiple filter assemblies comprises:

a housing;

a second plurality of resonant cavities within said housing;

wherein a second plurality of the input ports are mounted to said housing to interface with each of said plurality of resonant cavities; and wherein the common output port is mounted to said housing to interface with all of said second plurality of resonant cavities.

* * * * *